(12) United States Patent
Namuduri

(10) Patent No.: US 7,322,895 B2
(45) Date of Patent: Jan. 29, 2008

(54) AUTOMOTIVE ACCESSORY DRIVE SYSTEM

(75) Inventor: Chandra S. Namuduri, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/286,688

(22) Filed: Nov. 23, 2005

(65) Prior Publication Data

US 2007/0142145 A1    Jun. 21, 2007

(51) Int. Cl.
F16H 7/08    (2006.01)
F16H 7/22    (2006.01)
(52) U.S. Cl. .................................. 474/110; 474/109
(58) Field of Classification Search ............. 474/110, 474/109, 188; 198/813, 814
See application file for complete search history.

(56) References Cited

U.S. PATENT DOCUMENTS

| | | | |
|---|---|---|---|
| H001292 H * | 3/1994 | Marsh | 60/326 |
| 5,752,891 A * | 5/1998 | Meckstroth et al. | 474/110 |
| 6,817,597 B1 * | 11/2004 | Thurow et al. | 267/122 |
| 2002/0039942 A1 * | 4/2002 | Liu et al. | 474/133 |
| 2005/0148420 A1 * | 7/2005 | Murao | 474/133 |

\* cited by examiner

*Primary Examiner*—Richard Ridley
*Assistant Examiner*—James Pilkington

(57) ABSTRACT

The apparatus of the present invention provides an improved automotive accessory drive system. The automotive accessory drive system including a drive pulley operatively connected to an engine, and a plurality of driven pulleys operatively connected to one of a plurality of driven devices. A flexible drive belt connectively couples the drive pulley and the plurality of driven pulleys, and is operable to transfer drive forces therebetween. The automotive accessory drive system also includes a flexible drive belt tensioner operable to maintain frictional engagement between the flexible drive belt and the drive pulley and at least one of the driven pulleys. The flexible drive belt tensioner has a damper element that preferably includes a damper housing, and a variable viscosity fluid disposed within the damper housing. The variable viscosity fluid is configured to provide a variable dampening rate and is selectively operable to lock the flexible drive belt tensioner.

6 Claims, 1 Drawing Sheet

AUTOMOTIVE ACCESSORY DRIVE SYSTEM

TECHNICAL FIELD

The present invention provides an automotive accessory drive system with an improved drive belt tensioner.

BACKGROUND OF THE INVENTION

With the current desire for fuel efficient and low emission vehicles, many novel solutions for internal combustion engine architecture and operating strategies have been developed. One such idea is the Belt Alternator Starter (BAS) system. This system provides increases in fuel economy by shutting off the engine when at an idle operating mode, and enabling early fuel cut-off during decelerations. The BAS system can also accommodate regenerative braking. The BAS system combines engine controls with a combined alternator/starter motor mounted with respect to the engine in a typical accessory drive position. As such, this BAS strategy has minimal impact on engine and transmission architectures when compared to other hybrid strategies.

The typical automotive accessory drive system consists of a drive pulley connected to an output shaft of the engine, typically the crankshaft. Wrapped around this pulley is a flexible drive belt, which in turn is wrapped around a plurality of driven pulleys. This flexible drive belt transmits drive forces between the drive pulley and the driven pulleys. The driven pulleys may be fixably attached to accessories known in the art such as a power steering pump, air conditioning compressor, alternator, and secondary air pump. However, some of these driven pulleys may be idler pulleys which may be used to ensure proper belt wrap of a given driven pulley or they may be used to ensure proper belt routing.

The BAS system employs a combined starter/alternator motor mounted with respect to the other components of the accessory drive system. This system combines the alternator and starter motor into one device that can be mounted in effectively the same way and in effectively the same packaging space as a traditional alternator. The BAS system must be able to effect a restart of the engine quickly and quietly. The engine is cranked by the combined alternator/starter motor unit whose driven pulley is linked with the engine's output shaft mounted drive pulley by a flexible drive belt. This flexible drive belt has a tension or taut side and slack side while the engine is running. A flexible drive belt tensioner is typically employed to maintain tension on the slack side of the flexible drive belt. Without this tension, the flexible drive belt may slip, which in turn may cause "belt squeal" or, in extreme cases, belt damage and loss of accessory function. A typical flexible drive belt tensioner consists of an idler pulley which is in communication with the flexible drive belt, a spring to provide the necessary force to the idler pulley, and a viscous damper operable to dampen any resonances that may be induced in the tensioner by the flexible drive belt.

When a request is made to restart the engine, the driven pulley mounted to the combined alternator/starter motor will impart the rotational force necessary to crank the engine to the output shaft mounted via the flexible drive belt. Consequently, the normally slack side of the flexible drive belt becomes the tension side during engine restart. To maintain the required frictional force between the flexible drive belt and the drive and driven pulleys during restart, a flexible drive belt tensioner with a very high spring load is often employed. This spring load is much higher than would be necessary to maintain slack side tension for a non-BAS system or the BAS system while the engine is in running mode.

SUMMARY OF THE INVENTION

The present invention provides an automotive accessory drive system incorporating an improved drive belt tensioner. The automotive accessory drive system includes a drive pulley operatively connected to an engine, and a plurality of driven pulleys operatively connected to one of a plurality of driven devices. A flexible drive belt connectively couples the drive pulley and the plurality of driven pulleys, and is operable to transfer drive forces between the drive pulley and the driven pulleys. The automotive accessory drive system also includes a flexible drive belt tensioner operable to maintain frictional engagement between the flexible drive belt and the drive pulley and at least one of the driven pulleys. The flexible drive belt tensioner has a damper element that preferably includes a damper housing, and a variable viscosity fluid disposed within the damper housing. The variable viscosity fluid is configured to provide a variable dampening rate and is selectively operable to lock the flexible drive belt tensioner.

According to one aspect of the invention, the variable viscosity fluid is a magneto-rheological fluid.

According to another aspect of the invention, the damper element includes a conductive coil configured to produce a magnetic field adapted to selectively alter the viscosity of said magneto-rheological fluid.

According to yet another aspect of the invention, the damper element includes a piston defining a groove configured to retain the conductive coil.

According to still another aspect of the invention, the damper element includes a compressed gas charge disposed within an end portion of the damper housing.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
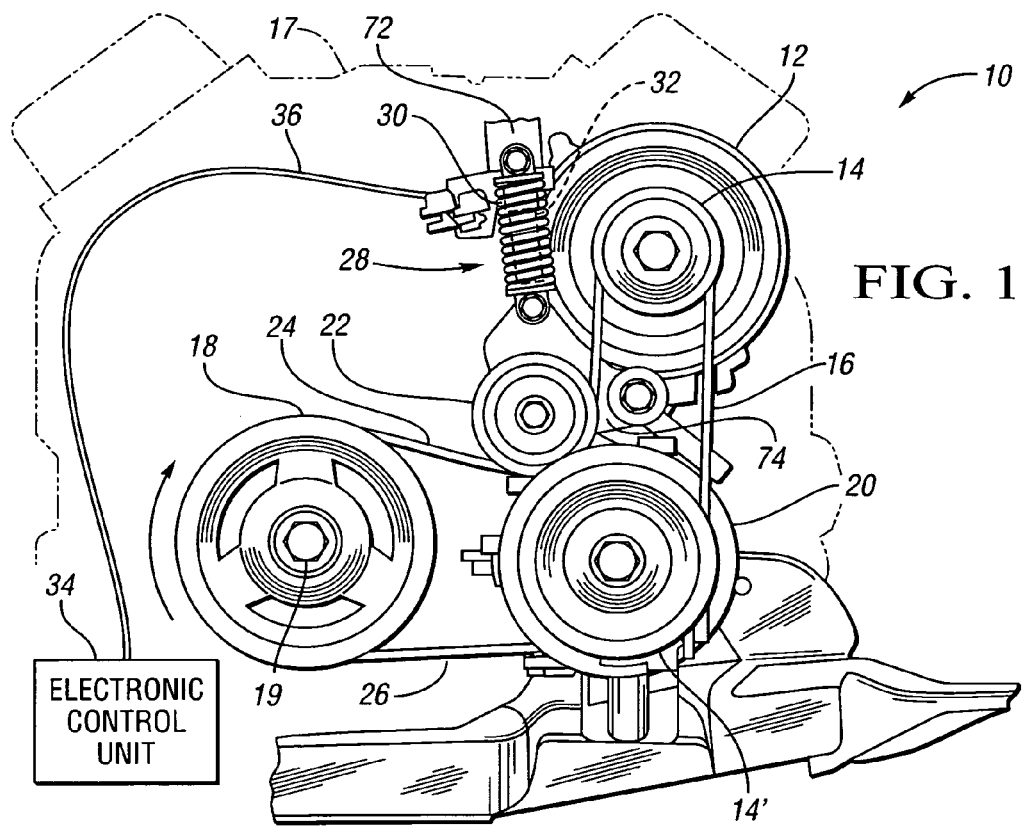
FIG. 1 illustrates a front view of a BAS automotive accessory drive system consistent with the present invention.

FIG. 1 illustrates a Belt Alternator Starter (BAS) accessory drive system 10 consistent with the present invention. The BAS accessory drive system 10 has, as its main component, a combined alternator/starter motor 12 operable to effect a restart of the engine 17 as well as to provide a charging circuit for the electrical system of the vehicle. A driven pulley 14 is connectively configured to the combined alternator/starter motor 12, and is in frictional engagement with a flexible drive belt 16. The flexible drive belt 16 transmits drive forces between the driven pulley 14 and the drive pulley 18. The drive pulley 18 is connectively configured to the engine's output shaft 19. The typical BAS accessory drive system 10 may also include other driven pulley mounted accessories known in the art such as a power steering pump, water pump, secondary air pump, or as in FIG. 1, an air conditioning compressor 20. In addition, the BAS accessory drive system 10 may also include one or more idler pulleys such as 22. An idler pulley 22 may be used to ensure proper flexible drive belt 16 "wrap" around a given driven pulley 14 or drive pulley 18, or may be used to ensure proper flexible drive belt 16 routing.

Due to the rotational nature of the drive pulley 18 to that of the driven pulleys 14 and 14', the flexible drive belt 16 will have a slack side 24 and a tension or taut side 26 on either side of the drive pulley 18 during normal engine running conditions. The presence of a slack side 24 necessitates the use of a flexible drive belt tensioner 28. The flexible drive belt tensioner 28 is operable to maintain frictional engagement between the flexible drive belt 16 and the driven pulley 14. In the absence of a flexible drive belt tensioner 28, the BAS accessory drive system 10 would be prone to flexible drive belt 16 slippage, which could possibly emit an unpleasant noise referred to as "belt squeal". In extreme cases, this slippage may lead to flexible drive belt 16 damage and loss of accessory function.

A flexible drive belt tensioner 28 typically consists of an idler pulley 22 for flexible drive belt 16 engagement, a spring element 30 operable to provide the necessary tension in the flexible drive belt 16, and a damper element 32 capable of attenuating any vibrations introduced by the flexible drive belt 16. The prior art BAS equipped accessory drive system will typically employ a spring with a very high spring rate. This spring rate is necessary to counteract the reversal of the slack side 24 and tension or taut side 26 of the flexible drive belt 16 during engine restart by the combined alternator/starter motor 12. The selectively lockable nature of the flexible drive belt tensioner 28 of the present invention will obviate the need for a spring 30 with a high spring rate by selectively locking the flexible drive belt tensioner 28 in place during critical points of the engine restart procedure.

Figure 2:
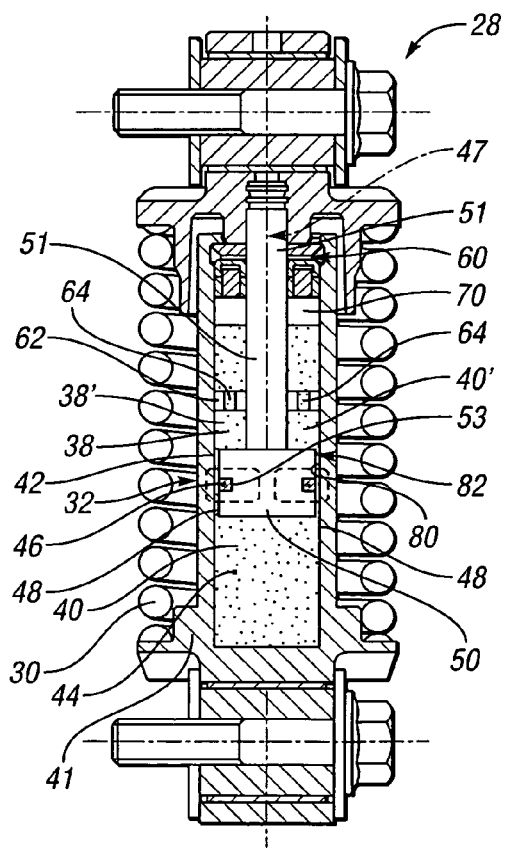
FIG. 2 illustrates a fragmentary sectional view of a flexible drive belt tensioner in accordance with the present invention.

Referring to FIG. 2, a sectional view of the flexible drive belt tensioner 28 is shown. The damper element 32 is circumscribed by the spring 30, and is electrically connected to an electronic control unit (ECU) 34 (shown in FIG. 1) via the electrical connection 36 (shown in FIG. 1). The damper element 32 includes a damper housing 41 defining a generally cylindrical interior surface 42. It should be appreciated; however, that the internal configuration of the damper housing 41 may be of other designs than those cylindrical designs presented, such as rotary-type dampers, while still falling within the spirit of that which is claimed.

The damper element 32 includes a variable viscosity fluid 38 disposed within two variable volume cavities 40 and 40' defined at least partially by the inside diameter 80 of the damper housing 41 and a piston 50 which is reciprocally movable within the damper housing 41. The piston 50 defines an outer diameter 82 that is less than the inside diameter 80 of the damper housing 41 such that a passage 48 is formed between the piston 50 and the cylindrical interior surface 42 of the damper housing 41. The passage 48 is configured to permit the transfer of the variable viscosity fluid 38 between the cavities 40 and 40' as the piston 50 is translated. In the preferred embodiment, the variable viscosity fluid 38 is a magneto-rheological (MR) fluid 38'; however alternate fluids such as, for example, electro-rheological fluid may also be envisioned. The MR fluid 38' has a dense suspension of micrometer-sized particles 44 in a liquid that will cause the MR fluid 38' to solidify into a pasty consistency of high viscosity in the presence of a magnetic field, and re-liquefy upon removal of the field.

A piston rod 51 establishes a connection between the piston 50 and the idler pulley 22 as will be described in detail hereinafter. Accordingly, the piston rod 51 extends from the piston 50, through the MR fluid 38', and out of the damper housing 41. A seal 60 is disposed about the periphery of the piston rod 51 near an end portion of the damper housing 41 such that MR fluid 38' does not leak as the piston rod 51 is extended from the damper housing 41. A centering disc 62 is mounted around the piston rod 51 at an axial position between the piston 50 and the seal 60 such that the centering disc 62 remains within the damper housing 41 throughout the entire range of motion of the piston rod 51. The outer diameter of the centering disc 62 is slightly less than the inner diameter 80 of the damper housing 41 such that the piston rod 51, and the piston 50 attached thereto, are radially centered within the damper housing 41. The centering disc 62 defines a plurality of passages 64 allowing MR fluid 38' to flow through the centering disc 62 in a minimally restrictive manner as the piston 50 is translated within the damper housing 41.

The piston 50 preferably defines an annular groove 53 around the periphery thereof. A conductive coil 46 is wrapped around the piston 50 within the annular groove 53. A coil lead 47 disposed through the piston rod 51 electrically connects the conductive coil 46 and the electrical connection 36 such that current is transferable by the ECU 34 to the conductive coil 46. Current supplied by the ECU 34 to the conductive coil 46 generates an electromagnetic field. This field will cause the viscosity of the MR fluid 38' disposed within the passage 48 to increase thereby restricting the movement of piston 50 and increasing the resistance of the damper element 32. Advantageously, the viscosity of the MR fluid 38' can be increased to a point where flow through the passage 48 is no longer possible, thereby effectively locking the flexible drive belt tensioner 28. It should be appreciated that the damping rate of the damper element 32 is variable and can be controlled with the ECU 34 by varying the current supplied to the conductive coil 46 to thereby alter the viscosity of the MR fluid 38'. By sensing the spring displacement such as with a conventional sensor (not shown), the current supplied to the conductive coil 46 can be continuously adjusted to provide a damping rate configured to minimize the relative velocity, acceleration, and/or displacement of the flexible drive belt tensioner 28.

A compressed gas charge 70 is preferably disposed within the damper housing 41. When the piston rod 51 is fully compressed within the damper housing 41, the piston rod 51 occupies a predefined volume which must be accounted for as the piston rod 51 is extended out of the damper housing 41. More precisely, as the piston rod 51 is translated out of the damper housing 41 a vacuum can form causing inconsistent dampening characteristics of the damper element 32 and/or leakage of the MR fluid 38'. Therefore, to avoid the formation of a vacuum, the compressed gas 70 is provided to expand and occupy the space left vacant as the piston rod 51 is translated out of the damper housing 41.

An end portion of the damper housing 41 is rigidly connected to a mounting plate 74, and the piston rod couples a mounting bracket 72 to the piston 50 thereby providing the reactive force necessary to maintain the idler pulley 22 (shown in FIG. 1) in a fixed translational position against the flexible drive belt 16. According to an alternate embodiment, the drive belt tensioner 28 may be mounted in an inverted position such that the mounting plate 74 rigidly connects the piston rod 51 and the idler pulley 22; however any number of other conventional connection methods may be envisioned. The flexible drive belt tensioner 28 as illustrated is direct acting, meaning that the idler pulley 22 will travel in a purely linear path. It is not the inventors' intention to limit the scope of this invention to only direct acting tensioners. The idler pulley 22 may be made to travel in an arc such as, for example, with the addition of a bell crank mechanism while still falling within the scope of the invention.

Referring again to FIG. 1, the selectively lockable nature of the flexible drive belt tensioner 28 is of particular benefit when employed in a BAS accessory drive system 10. When a start request is made by the operator of the BAS accessory drive system 10 equipped vehicle, usually by turning the ignition key or lifting the brake pedal, the ECU 34 will command the damper element 32 of the flexible drive belt tensioner 28 to lock in position by energizing the variable viscosity fluid 38 (shown in FIG. 2) therewith in. The ECU 34 will subsequently command the combined alternator/starter motor 12 to crank the engine. The locked flexible drive belt tensioner 28 will provide the tension to the flexible drive belt 16 necessary to maintain frictional engagement of the driven pulley 14 and the drive pulley 18. Upon engine restart, the electronic control unit 34 will de-energize the variable viscosity fluid 38, thereby unlocking the flexible drive belt tensioner 28. The ability to selectively lock and unlock the flexible drive belt tensioner 28 will obviate the need for an overly aggressive spring load for the flexible drive belt tensioner 28. Therefore, the life of the flexible drive belt 16 and bearing life of the accessory drive components may increase While the best modes for carrying out the invention have been described in detail, those familiar with the art to which this invention relates will recognize various alternative designs and embodiments for practicing the invention within the scope of the appended claims.

The invention claimed is:

1. An automotive accessory drive system comprising:
   a drive pulley connected to an engine output shaft;
   a plurality of driven pulleys each of which is operatively connected to one of a plurality of driven devices;
   a flexible drive belt connectively coupling said drive pulley and said plurality of driven pulleys and operable to transfer drive forces between said drive pulley and said plurality of driven pulleys; and
   a flexible drive belt tensioner operable to maintain frictional engagement between said flexible drive belt and said drive pulley and at least one of said plurality of driven pulleys, said flexible drive belt tensioner having a damper element including:
   a damper housing;
   a compressed gas charge sealed within an end portion of said damper housing, said charge being sufficient to expand and occupy space left vacant in the damper housing to improve dampening characteristics;
   a variable viscosity fluid disposed within said damper housing, said variable viscosity fluid being configured to provide a variable dampening rate and being selectively operable to lock said flexible drive belt tensioner; and
   a conductive coil configured to produce a magnetic field adapted to selectively alter the viscosity of said variable viscosity fluid.

2. The automotive accessory drive system of claim 1, wherein one of said plurality of driven pulleys is connected to a combined alternator/starter motor.

3. The automotive accessory drive system of claim 2, wherein said variable viscosity fluid is a magneto-rheological fluid.

4. The automotive accessory drive system of claim 3, wherein said damper element includes a piston disposed within said damper housing, said piston having a groove configured to retain said conductive coil.

5. The automotive accessory drive system of claim 4, further comprising a controller electronically connected to said conductive coil, said controller configured to facilitate the selective transfer of electricity to the conductive coil to alter the viscosity of said magneto-rheological fluid.

6. An automotive accessory drive system comprising:
   a drive pulley connected to an engine output shaft;
   a plurality of driven pulleys each of which is connected to one of said plurality of driven devices, one of said plurality of driven devices being a combined alternator/starter motor;
   a flexible drive belt connectively coupling said drive pulley and said plurality of driven pulleys and operable to transfer drive forces between said drive pulley and said plurality of driven pulleys; and
   a flexible drive belt tensioner operable to maintain frictional engagement between said flexible drive belt and said drive pulley and at least one of said plurality of driven pulleys, said flexible drive belt tensioner having a damper element including:
   a damper housing;
   a variable viscosity fluid disposed within said damper housing, wherein said variable viscosity fluid is a magneto-rheological fluid;
   a conductive coil disposed within said damper housing and in close proximity to said variable viscosity fluid, said conductive coil configured to produce a magnetic field adapted to selectively alter the viscosity of said variable viscosity fluid;
   a piston disposed within said damper housing, said piston having a groove configured to retain said conductive coil, said piston being sized to be reciprocally movable within the damper housing and adapted to define a passage in cooperation with the piston and an inner wall of the damper housing, said passage permitting selectively controlled flow of variable viscosity fluid in a region between the piston, conductive coil and damper housing inner wall regulating dampening rate of the piston within the damper housing, wherein the dampening rate is controlled by the magnetic field selectively altering viscosity of fluid in the passage, wherein the magnetic field can be controlled to increase the viscosity of said fluid to a point where flow in the passage is no longer possible, thereby locking the damper element in position within the damper housing, locking said flexible drive belt tensioner; and
   a controller electronically connected to said conductive coil, said controller configured to facilitate the selective transfer of electricity to the conductive coil to alter the viscosity of said magneto-rheological fluid;
   wherein said damper element includes a compressed gas charge sealed within an end portion of said damper housing, said charge being sufficient to expand and occupy space left vacant in the damper housing to improve dampening characteristics.

* * * * *